United States Patent [19]
Kenin et al.

[11] Patent Number: 6,064,533
[45] Date of Patent: May 16, 2000

[54] ZOOM ASSEMBLY

[75] Inventors: Michael Kenin, Rochester; James A. Schmieder, Wayland; Mark D. Bedzyk, Rochester; Dean A. Johnson, Churchville, all of N.Y.

[73] Assignee: Eastman Kodak Company, Rochester, N.Y.

[21] Appl. No.: 09/282,997

[22] Filed: Mar. 31, 1999

[51] Int. Cl.[7] .................................................. G02B 15/14
[52] U.S. Cl. .......................................... 359/695; 359/701
[58] Field of Search .................................... 359/695, 701, 359/694, 706

[56] References Cited

U.S. PATENT DOCUMENTS

| | | | |
|---|---|---|---|
| 4,198,129 | 4/1980 | Vockenhuber | 350/187 |
| 5,194,991 | 3/1993 | Yamanashi | 359/693 |
| 5,646,790 | 7/1997 | Kohmoto et al. | 359/823 |
| 5,726,810 | 3/1998 | Meyers | 359/684 |
| 5,825,556 | 10/1998 | Meyers | 359/690 |

*Primary Examiner*—Georgia Epps
*Assistant Examiner*—Younggil Timothy Lee
*Attorney, Agent, or Firm*—Svetlana Z. Short

[57] ABSTRACT

The first, movable encloses the front, middle and rear lens groups. The front and rear lens groups are supported by a front and a rear lens cell, respectively. At least one of the front and rear lens cells is an integral part of the front lens barrel. The front and rear lens cells are located at a fixed distance with respect to one another. The middle lens group is supported by a mid-lens cell. The mid-lens cell is slidably movable within the first, movable barrel and has at least three external cam followers. The second, movable barrel engages and at least partially encloses the first barrel and includes three cam grooves engaging the cam followers. The motor is operatively connected to the second, movable barrel. The motor rotates the second, movable, so that the second, movable barrel moves along the optical axis with respect to the first, movable barrel. The rotation of the second movable barrel causes the cam followers to move within the cam grooves such that the mid-lens group moves axially at a different rate than the front and rear lens groups.

23 Claims, 11 Drawing Sheets

ZOOM ASSEMBLY

CROSS REFERENCE TO RELATED APPLICATIONS

Reference is made to commonly assigned, copending U.S. Patent Application Serial No., entitled A ZOOM ASSEMBLY HAVING AN IMPROVED CAM BARREL, by Kenin et al; and U.S. Patent Application Serial No., entitled A ZOOM ASSEMBLY HAVING ZOOM LENS WITH A PLURALITY OF LENS GROUPS THAT MOVE TOGETHER OR DIFFERENTIALLY FOR ZOOMING AND FOCUSING, by Kenin et al, filed concurrently herewith.

FIELD OF THE INVENTION

The present invention relates a zoom assembly containing a lens barrel, a cam barrel, and only three lens cells—front, middle, and rear, situated in the lens barrel. The front and the rear lens cells are connected and move at the same speed and direction and the middle lens cell moves at a different rate, in response to the rotary drive force engaging the cam barrel.

BACKGROUND OF THE INVENTION

Recently, there have been an interest in producing inexpensive, compact, light weight and reliable zoom cameras with a zoom ratios of greater than 1.5× that provide an excellent image quality over the entire zoom range for the objects that are located both short and long distances away.

U.S. Pat. Nos. 5,825,556 and 5,726,810 disclose zoom lenses for such a camera. These zoom lenses are very compact and have only five lens elements arranged into three moving groups. The front and the rear lens groups move in unison-i.e., at the same speed and direction, while the middle lens group moves at a different rate. U.S. Pat. No. 5,726,810 discloses that the lens mounts for the front and rear lens groups are attached to a lens barrel and that the mount for the middle lens group slides along the guide rods mounted inside this lens barrel. U.S. Pat. No. 5,825,556 does not disclose a mechanism for moving the lens groups.

U.S. Pat. No. 4,198,129 discloses a zoom assembly with a zoom lens that has at least four lens groups. Three of the lens groups are movable. In one embodiment, two of the three movable lens groups are situated in the lens barrels that are linked and move parallel to one another. The remaining lens barrel, supporting the third lens group, is sandwiched between the two linked lens barrels and is either stationary or moves at the same rate and direction as the above described linked lens barrels. Because of this construction, the zoom assembly utilizes at least one additional stationary lens group. However, having four or more lens groups results in a large size zoom assembly and increases its cost.

In addition, in order to move lens groups relative to one another, the zoom assembly disclosed in U.S. Pat. No. 4,198,129 utilizes three stepper motors and a plurality of guide rods. If these guide rods are not aligned perfectly with respect to one another and the rest of the zoom assembly, the lens barrels will not move properly and, may even stop moving altogether. Finally, stepper motors are relatively expensive, and having three such motors not only significantly increases the cost of the zoom assembly, but also makes this zoom assembly bulky and heavy.

U.S. Pat. No. 5,194,991 discloses a zoom assembly having a zoom lens that has three moving lens groups. This zoom lens is capable of micro photography. In order to accomplish zooming from the wide angle position to the telephoto position each of the lens groups moves at a different rate with respect to the other lens groups. The zooming action is accomplished by a cam sleeve that has three differently configured cam grooves. Because these cam grooves require three sets of cam followers (one for each lens group), this zoom assembly is relatively difficult to align and assemble, resulting in higher cost of production.

This patent also discloses that the second lens group moves along a rod. If this rod is not aligned perfectly with respect to the rest of the zoom assembly, the lens barrels will not move properly and, may jam and stop moving altogether. Furthermore, the disclosed mechanism utilizes an additional focusing motor for focus adjustment, making this zoom assembly expensive to manufacture.

U.S. Pat. No. 5,646,790 also discloses a zoom assembly mechanism with three moving lens barrels. The patent discloses three differently shaped cam profiles that enable the three lens groups to move relative to one another. This configuration requires three sets of cam followers (each set corresponding to a different lens group), resulting in either a (i) tolerance buildup and thus a relatively expensive alignment and assembly, or (ii) in tighter tolerance requirements and, thus, higher manufacturing costs.

SUMMARY OF THE INVENTION

It is an object of the present invention to provide a very compact zoom assembly with a minimum number of parts. Another object of this invention is to provide a zoom assembly which does not require guide rods and utilizes with only one motor for both zooming and focusing. Yet another object of this invention is to have a compact zoom assembly with only one cam barrel that has a plurality of identical cam grooves.

Briefly summarized, according to one aspect of the present invention, a zoom assembly comprises a zoom lens, a zooming mechanism and a motor. The zoom lens consists of a front lens group, a middle lens group and a rear lens group. The first and the rear lens groups move along an optical axis (defined by these lens groups) at the same speed and direction.

The zooming mechanism includes a first, movable barrel and a second, movable barrel. The first, movable encloses the front, middle and rear lens groups. The front and rear lens groups are supported by a front and a rear lens cell, respectively. At least one of the front and rear lens cells is an integral part of the front lens barrel. The front and rear lens cells are located at a fixed distance with respect to one another. The middle lens group is supported by a mid-lens cell. The mid-lens cell is slidably movable within the first, movable barrel and has at least three external cam followers.

The second, movable barrel engages and at least partially encloses the first barrel and includes three cam grooves engaging the cam followers.

The motor is operatively connected to the second, movable barrel. The motor rotates the second, movable barrel, so that the second, movable barrel moves along the optical axis with respect to the first, movable barrel. The rotation of the second movable barrel causes the cam followers to move within the cam grooves such that the mid-lens group moves axially at a different rate than the front and rear lens groups.

According to another aspect of the present invention a zoom assembly comprises: a zooming mechanism, and a zoom lens consisting of a front lens group, a middle lens group and a rear lens group. The front and rear lens groups move along an optical axis, defined by the lens groups, at the same speed and direction. The zooming mechanism includes (i) a first, movable barrel enclosing the front, middle and rear lens groups and a single sleeve having a plurality of identical cam grooves. The front and rear lens groups are supported by the front and the rear lens cells, respectively. At least one of the front and the rear lens cells is formed as an integral part of the lens barrel. The front and rear lens cells are located at a fixed distance with respect to one another. The middle lens group is slidably supported by a mid-lens cell, is movable with respect to the front and rear lens groups and has a plurality of cam followers. The single sleeve with a plurality of identical cam grooves forms a second, movable barrel. This second, movable barrel engages and at least partially encloses the first, movable barrel. The second, movable barrel is rotatable about the optical axis and the cam grooves engage the plurality of the cam followers of the mid-lens cell.

According to a preferred embodiment of the present invention, the first, movable barrel includes a helical thread and the second, movable barrel has a complimentary helical thread that engages the helical thread of the first, movable barrel.

Also, according to a preferred embodiment of the present invention, the zoom assembly also includes a third, stationary barrel having internal helical threads. The second, movable barrel includes external helical treads. The internal helical threads of the third, stationary barrel engage the external threads of the second, movable barrel, such that the second, movable barrel slides within the third, stationary barrel during zooming.

The above, and other objects, advantages and novel features of the present invention will become more apparent from the accompanying detailed description thereof when considered in conjunction with the following drawings.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Zoom Assembly Apparatus

Figure 1:
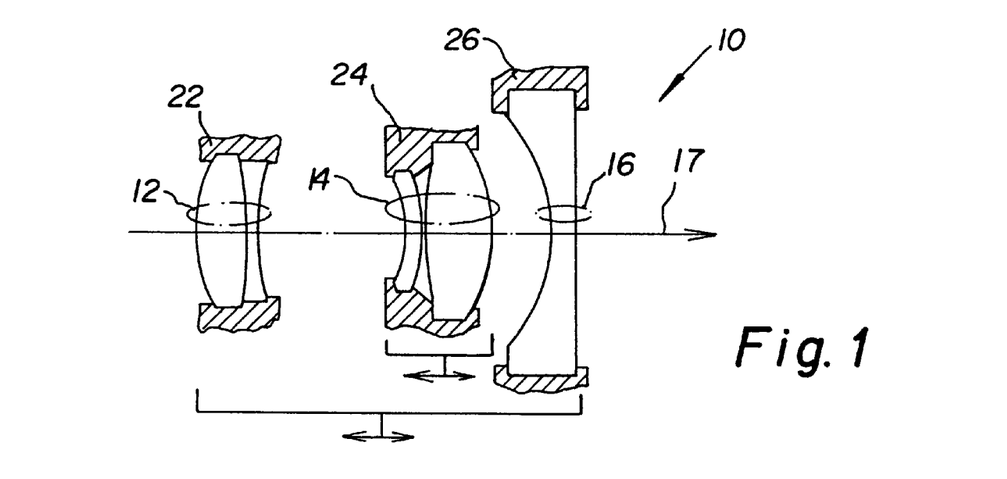
FIG. 1 illustrates a zoom lens.
Figure 2A:
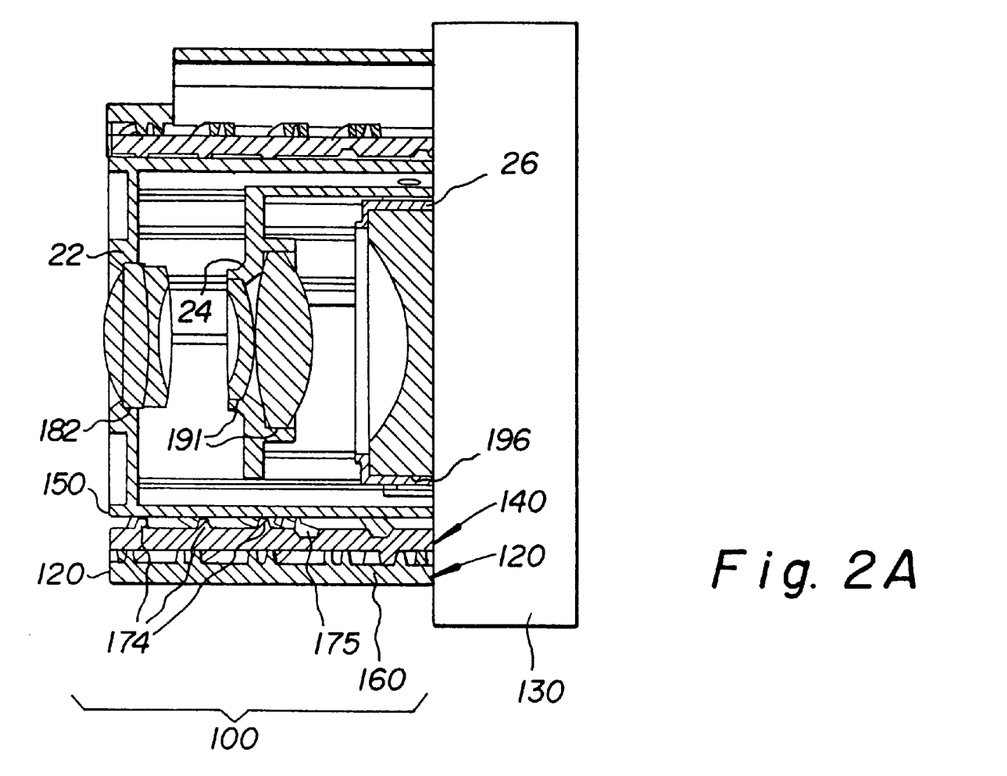
FIG. 2A is a cross sectional view of a zoom assembly of the first embodiment of the present invention, when the zoom assembly is in a parked position. This zoom assembly incorporates the zoom lens of FIG. 1.
Figure 2B:
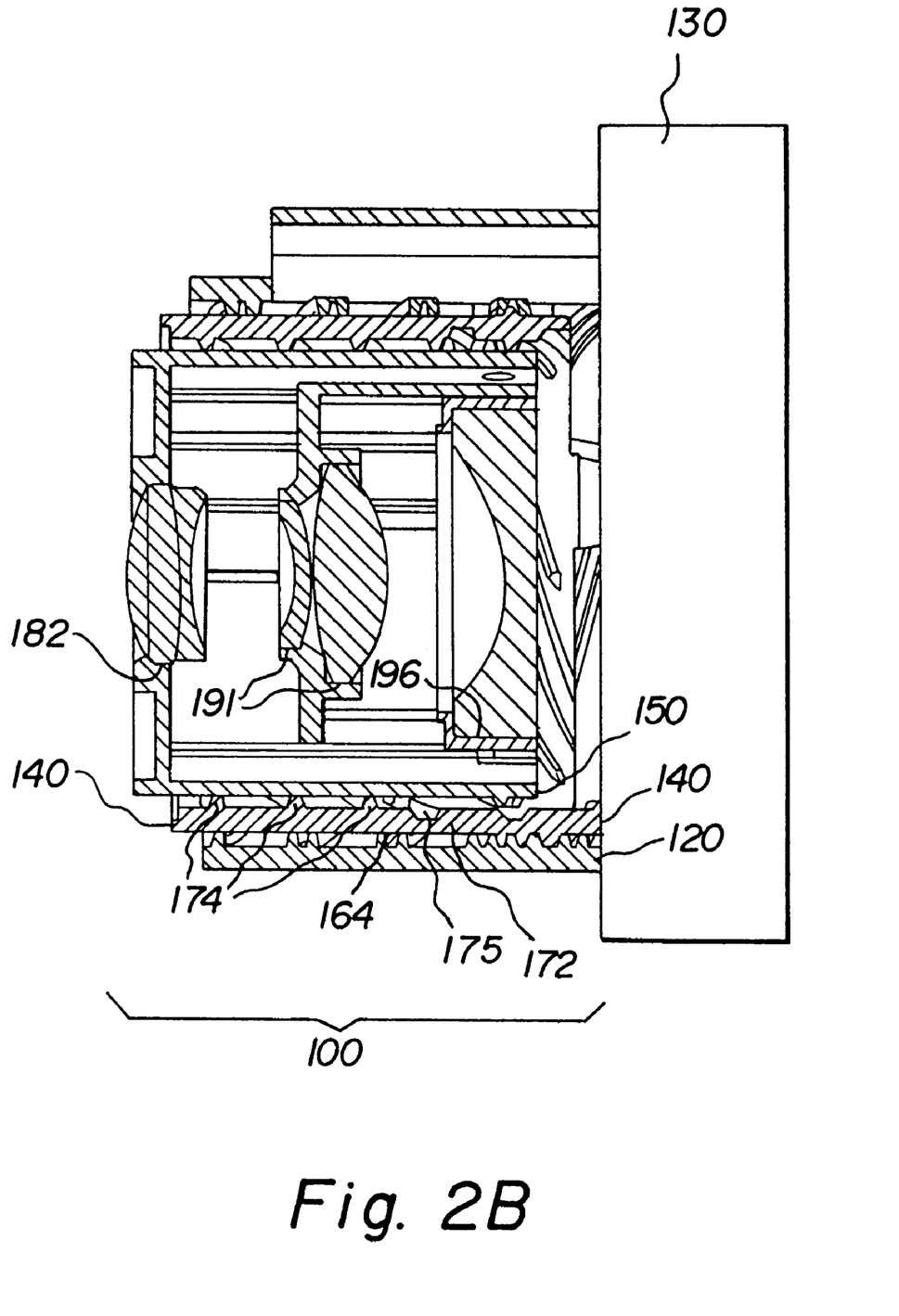
FIG. 2B is a cross sectional view of the zoom assembly of FIG. 2A when the zoom assembly is in a wide angle position.
Figure 2C:
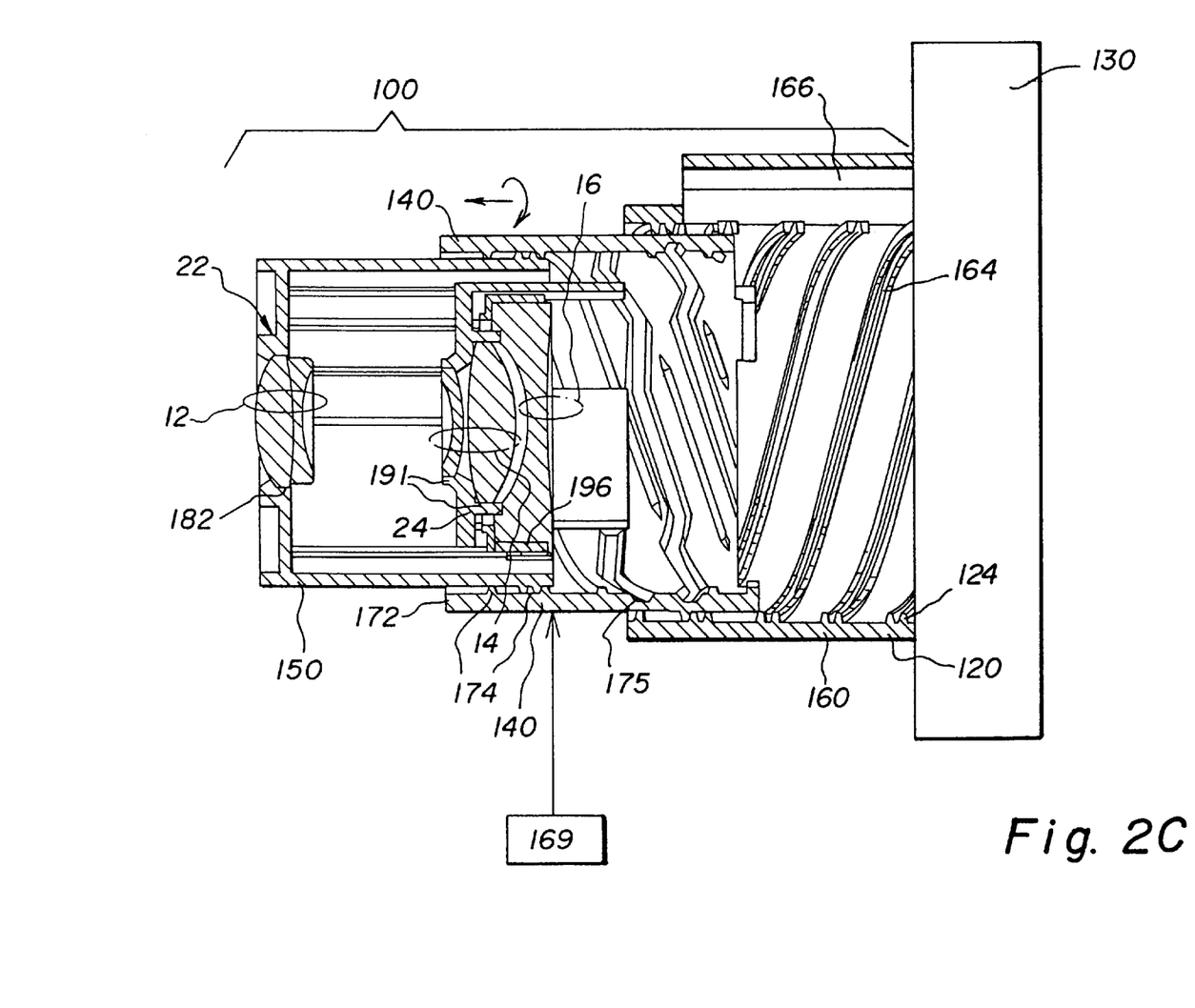
FIG. 2C is a cross sectional view of the zoom assembly of FIG. 2A when the zoom assembly is in a telephoto position.

Referring now to FIG. 1, a zoom lens 10 is depicted including the front, middle and rear lens groups 12, 14, 16, respectively disposed for movement along the optical axis 17. The front lens group 12 is situated inside a first lens cell 22, the middle lens group 14 is situated inside a mid-lens cell 24 and the rear lens group 16 is situated inside a rear lens cell 26 of a zoom assembly 100. During zooming, the middle lens group 14 moves along an optical axis 17, relative to the front and rear lens groups 12, 16. The front and rear lens groups 12, 16 move as a unit, i.e., they do not move relative to one another.

An example of a zoom lens 10 is provided below. The zoom lens 10 of this example provides 2.5× zoom ratio and comprises the front, positive power lens group 12, the middle, positive power lens group 14 and the rear, negative power lens group 16. The numerical data for the zoom lens 10 is provided in tables 1A–1C. In these tables $R_i$ stands for the radius of curvature of the i-th surface, $N_e$ stands for the index of refraction and v stands for the Abbe V-number of the refractive material.

TABLE 1A

| Surface | Radius | Thickness (T) | $N_e$ | v |
|---|---|---|---|---|
| $R_1$ | 10.957 | 3.26 | 1.606 | 43.9 |
| $R_2$ | −56.7590 | 1.0 | | |
| $R_3$ | 19.858 | 4.0 | 1.762 | 26.5 |
| Aperture Stop | | $S_2$ = Variable | | |
| $R_4$ | −7.718 | 1.0 | 1.497 | 81.6 |
| $R_5$ | −12.647 | 0.25 | | |
| $R_6$ | 25.924 | 4.474 | 1.502 | 56.28 |
| *$R_7$ | −10.179 | $S_4$ = Variable | | |
| *$R_8$ | −10.213 | 1.70 | 1.586 | 60.72 |
| $R_9$ | 207.317 | $S_5$ = Variable | | |
| Image Plane | | | | |

*Asphere

TABLE 1B

| Aspheric | Surface | |
|---|---|---|
| Coefficients | $R_7$ | $R_8$ |
| AD | $0.55158e^{-4}$ | $0.16177\ e^{-3}$ |
| AE | $0.93444e^{-5}$ | $0.310329e^{-5}$ |

TABLE 1B-continued

| | | |
|---|---|---|
| AF | −0.69206 e$^{−6}$ | −0.22765 e$^{−6}$ |
| AG | 0.24416 e$^{−7}$ | 0.79975 e$^{−8}$ |
| AH | −0.42091 e$^{−9}$ | −0.14109 e$^{−9}$ |
| AI | 0.27688e$^{−11}$ | 0.61400e$^{−12}$ |
| AJ | | 0.12934e$^{−13}$ |
| AK | | −0.12741e$^{−15}$ |
| K | −1.07394 | −0.23112 |

Where k is a conic constant.

| Wavelengths (μm) | | |
|---|---|---|
| $\lambda_1$ | $\lambda_2$ | $\lambda_3$ |
| 0.5461 | 0.4861 | 0.6563 |

TABLE 1C

Zoom Spacing Data

| Zoom Position # | S$_2$ | S$_4$ | BFL | EFL |
|---|---|---|---|---|
| 1 (wide) | 2.219 | 7.494 | 8.69 | 30.9 |
| 2 | 4.211 | 5.502 | 13.74 | 38.29 |
| 3 | 5.940 | 3.773 | 19.90 | 47.44 |
| 4 | 7.432 | 2.281 | 27.44 | 58.78 |
| 5 (telephoto) | 8.713 | 1.000 | 36.68 | 72.82 |

BFL is the back focus distance and, EFL is the focal length.

STOP Diameter

| Zoom Position # | Diameter |
|---|---|
| 1 (wide) | 4.94 |
| 2 | 5.46 |
| 3 | 6.06 |
| 4 | 6.71 |
| 5 (telephoto) | 7.44 |

Zoom lens 10 has two aspheric surfaces. The aspheric equation describing these aspheric surfaces is:

$$X = \frac{CY^2}{1 + \sqrt{1 - (k+1)C^2Y^2}} + ADY^4 + AEY^6 + AFY^8 + AGY^{10} + AHY^{12} + AIY^{14} + AJY^{16} + AKY^{18}$$

where:
X is the distance along the optical axis OA;
Y is the height from the optical axis;
C is the reciprocal of the vertex radius of curvature of the curved lens surface;
k is the conic constant; and AD through AK are aspheric coefficients of 4th, 6th, 8th, 10th, 12th, 14th, 16th, and 18th order. The values of the aspheric coefficients for the various aspheric lens surfaces for the lens embodiment are provided in Table 1B.

More specifically, the aspheric surfaces are located on the surfaces with radii $R_1$, $R_8$ and $R_9$ associated with lens elements $E_1$, $E_4$ and $E_5$.

Figure 3:
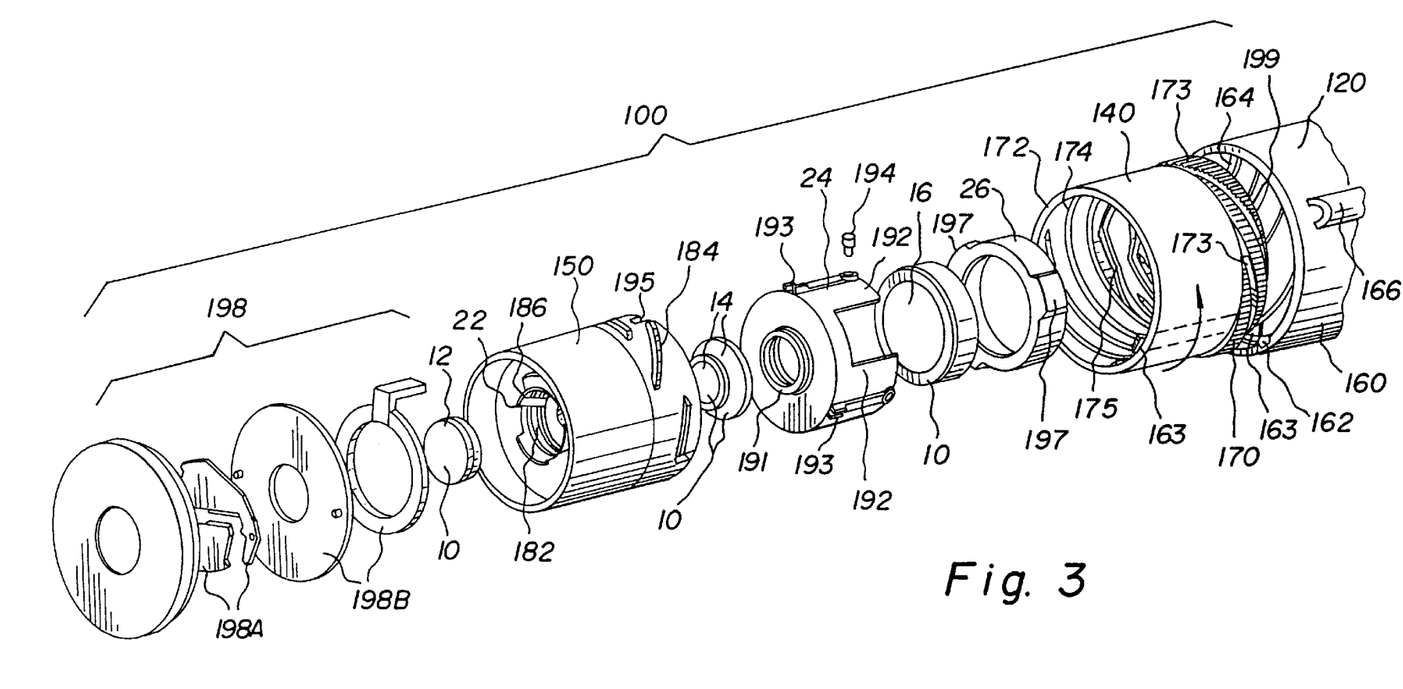
FIG. 3 is an exploded view of the zoom assembly of FIG. 1A.
Figure 4A:
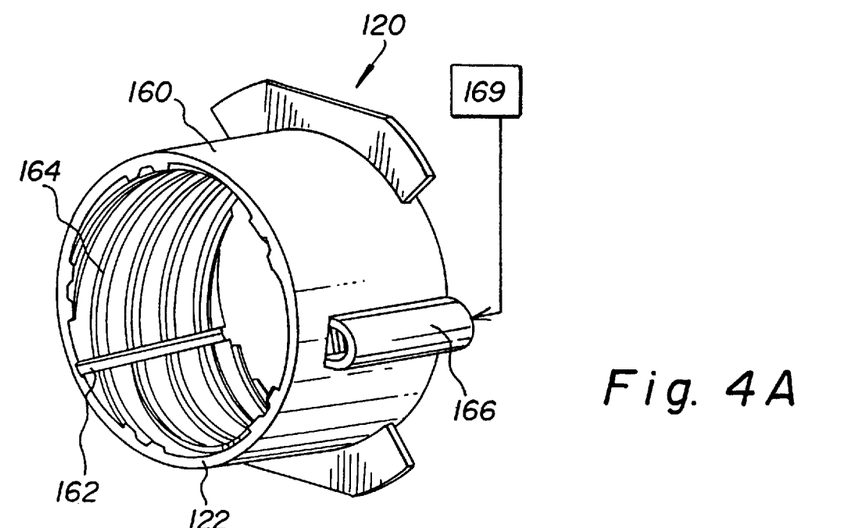
FIG. 4A is a perspective view of a frame barrel of the zoom assembly of FIG. 1A.
Figure 4B:
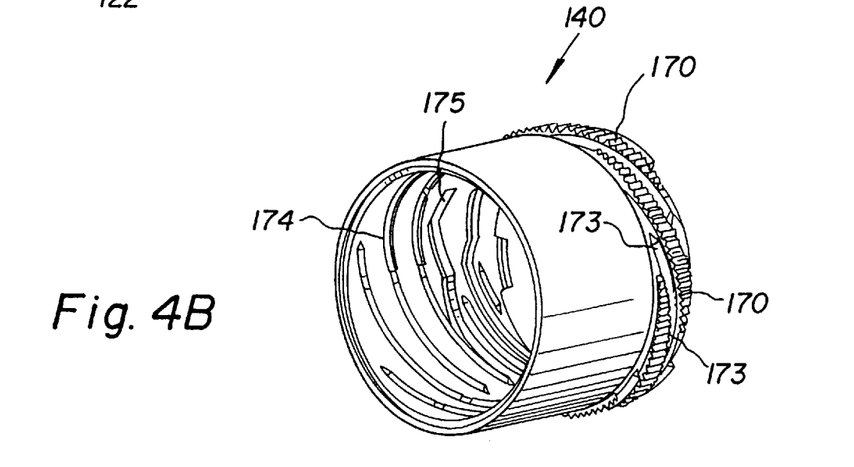
FIG. 4B is a perspective view of a deployment barrel of the zoom assembly of FIG. 1A.
Figure 4C:
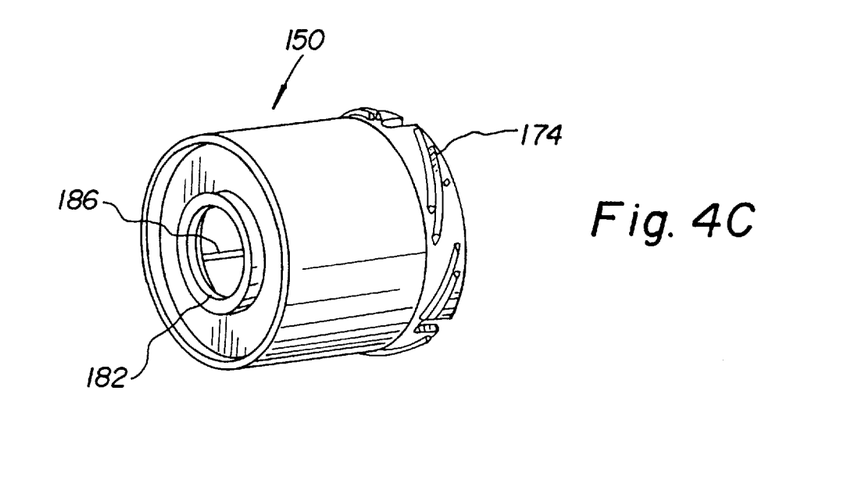
FIG. 4C is a perspective view of a front barrel of the zoom assembly of FIG. 1A.
Figure 5:
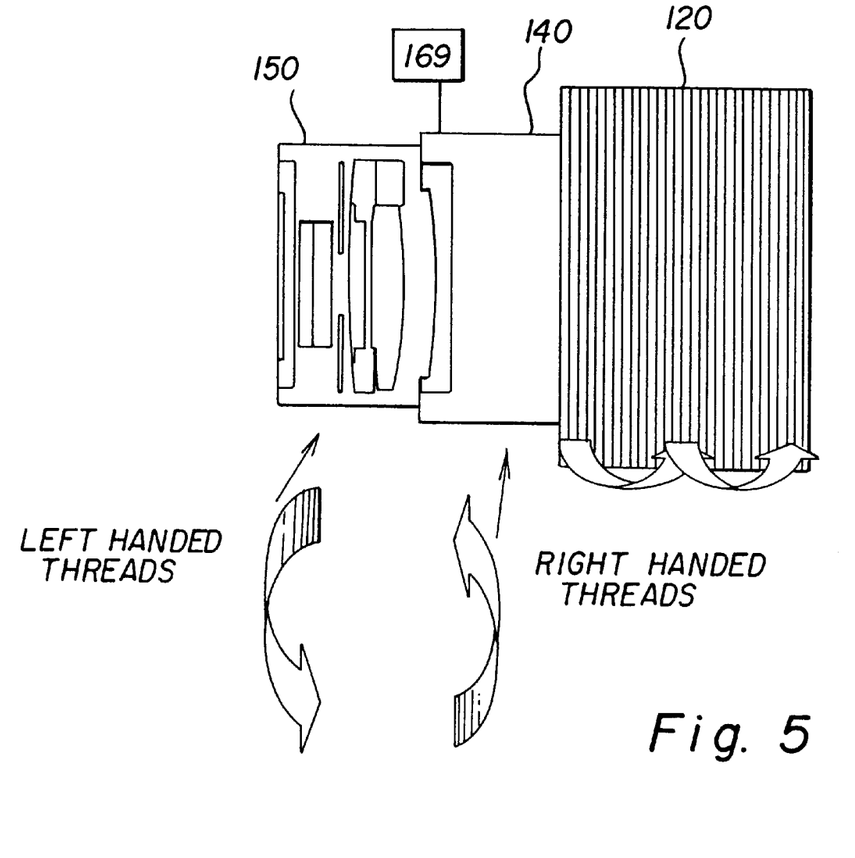
FIG. 5 illustrates, schematically, orientation of the helical threads on the three lens barrels of the zoom assembly of FIG. 3.

According to one embodiment of the present invention, the zoom assembly 100 (shown in FIGS. 2A–2C and 3) includes a frame barrel 120 (FIG. 4A), situated next to a camera body 130, a movable deployment barrel 140 (FIG. 4B), and a front barrel 150 (FIG. 4C). The deployment barrel 140 moves with respect to the frame barrel 120 by utilizing left and right handed helical threads (FIG. 5). The front lens cell 22, the mid-lens cell 24 and the rear lens cell 26 are situated inside the front lens barrel 150. The front lens cell 22 and the rear lens cell 26 are either molded with, or are fixedly attached to the front barrel 150 and are, therefore, stationary relative each other and to the front barrel 150. When a rotary force is applied to the deployment barrel 140, the mid-lens cell 24 moves within the front barrel 150 relative to the front and the rear lens cells 22, 26.

Figure 6:
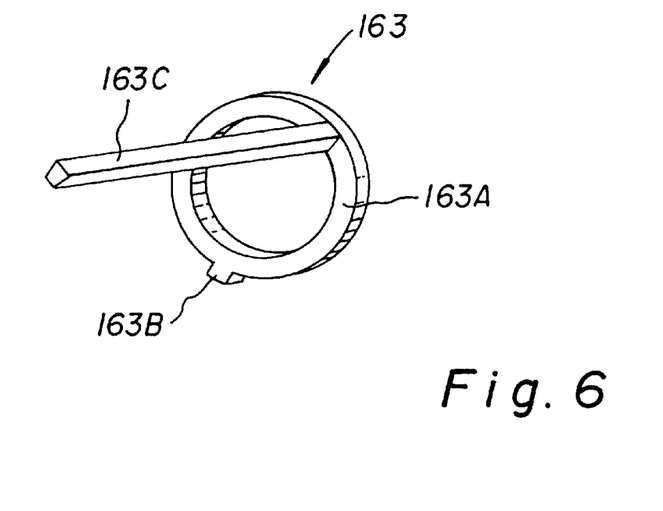
FIG. 6 illustrates the key used in a deployment barrel shown in a zoom assembly of FIG. 3.
Figure 7:
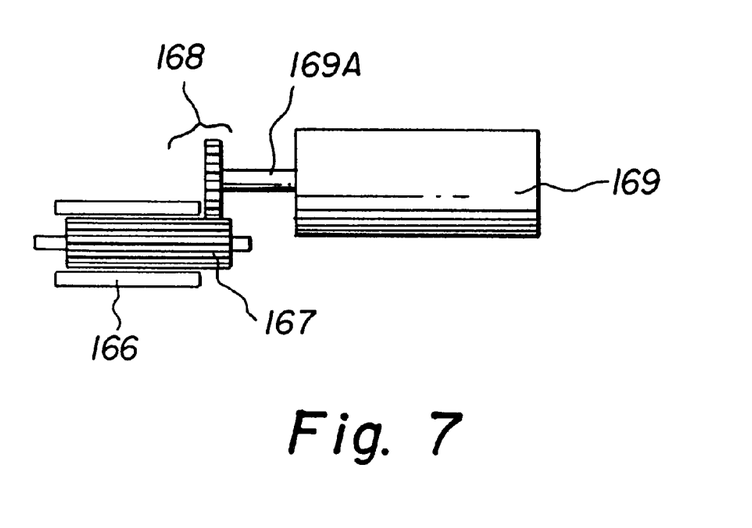
FIG. 7 is a schematic depiction of a motor of the zoom assembly of FIG. 3.

The frame barrel 120 is stationary and comprises a sleeve 160 that has a linear, directional guide slot 162 (FIGS. 3A and 4A) for a key 163, (shown in FIGS. 3A and 6). This key is described later on in the specification. The sleeve 160 also includes internal helical threads 164 for engagement of the external helical threads 173 of a smaller diameter deployment barrel 140. The frame barrel 120 also includes a support sleeve 166 encasing a long spur gear 167 which is operatively connected through a gear train 168 to the rotating shaft 169A of the reversible motor 169. (See FIG. 7). It is preferred that the motor 169 be a DC motor rather than a stepper motor, because DC motors are less expensive than stepper motors. The long spur gear 167 rotates the deployment barrel 140 by engaging with an external gear segment 170, described below.

Figure 8:
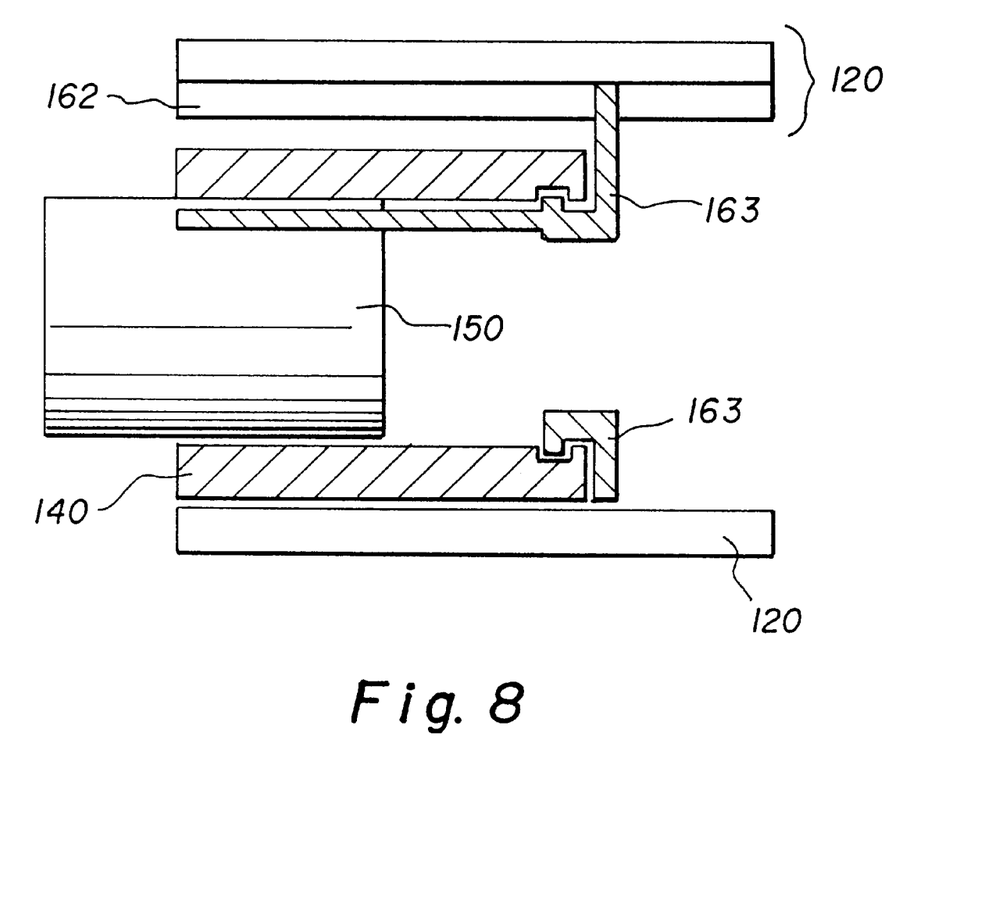
FIG. 8 is a schematic cross sectional view of the front barrel when the front barrel is positioned inside the frame barrel.

The deployment barrel 140 (see FIGS. 3 and 4B) is movable and is, at least partially, enclosed by the frame barrel 120. The key 163 (see FIGS. 3,6, and 8) is attached to the deployment barrel 140 and prevents the front barrel 150 from rotating around the optical axis. The key 163 is in a form of a ring 163A with a protrusion 163B and a long arm 163C. The long arm 163C is attached to the internal surface of the deployment barrel 140. The protrusion 163B of the key 163 slides inside the guide slot 162 of the frame barrel 120 when the deployment barrel 140 rotates and moves along the optical axis. The key 163 is attached to the deployment barrel 140 in a manner that allows the deployment barrel 140 to rotate around the key, while the key is prevented from rotation by the slot 162 inside the frame barrel 120. This is shown in FIG. 8.

The deployment barrel 140 comprises a single sleeve 172. The sleeve 172 contains external segmented helical male threads 173 for engaging the internal helical female threads 164 of the smaller diameter frame barrel 120. (See FIG. 3). The segmented threads 173 also include gear profiles forming the gear section 170. This gear section 170 is engaged to the spur gear 167. Thus, the deployment barrel 140 moves with respect to the frame barrel 120 when the motor 169 is activated. The gear section 170 and the helical threads 173 are molded as an integral part of the deployment barrel 140. The motor 169 is energizable by an output from an associated pulse generator unit (not shown), such as a microprocessor, for example.

The sleeve 172 of the deployment barrel 140 also includes the internal helical female threads 174 which engages the external helical male segmented threads of the front barrel 150. This is also shown in FIG. 3. The sleeve 172 also contains three identical, continuous internal cam grooves 175 which enable relative movement of the middle lens cell 24 with respect to the front and rear lens cells 22, 26. Having only one sleeve with only one set of cam grooves decreases the complexity and the cost of the zoom assembly by decreasing the number of separately movable parts. In addition to the zooming function, the camming action provides the focusing function, eliminating the need for a separate focusing motor. That is, the rotary force provided by the motor 169 enables the zoom lens 10 to zoom as well as to focus. More specifically, while moving from the wide angle to the telephoto position, the zoom lens 10 is focused on objects located within range from infinite distance to the short distance by moving either the whole zoom lens 10 as a unit, or by moving the middle lens group 14 relative to the front and rear lens groups 12, 16. Because this approach eliminates the need for a separate focusing motor it results in a zoom assembly that is very small size and lightweight. The details of the cam grove profile are described later in the specification.

The front barrel 150 (see FIG. 4C) is movable along the optical axis and does not rotate. The front barrel 150 contains the front lens cell 22 which is (plastic) molded integrally therewith and a mid-lens cell 24. The front lens cell 22 has lens seats 182 for the lens elements of the front (object side) lens group 12. The front barrel 150 also includes external segmented helical threads 184 for engaging complimentary threads 174 of the deployment barrel 140 and a plurality of internal straight linear grooves 186. (See FIG. 3 and FIG. 4C). The function of the grooves 186 is described later on in the specification. A shutter assembly (not shown) is located inside the front barrel 150 and is operatively connected to the mid-lens cell 24.

Figure 9:
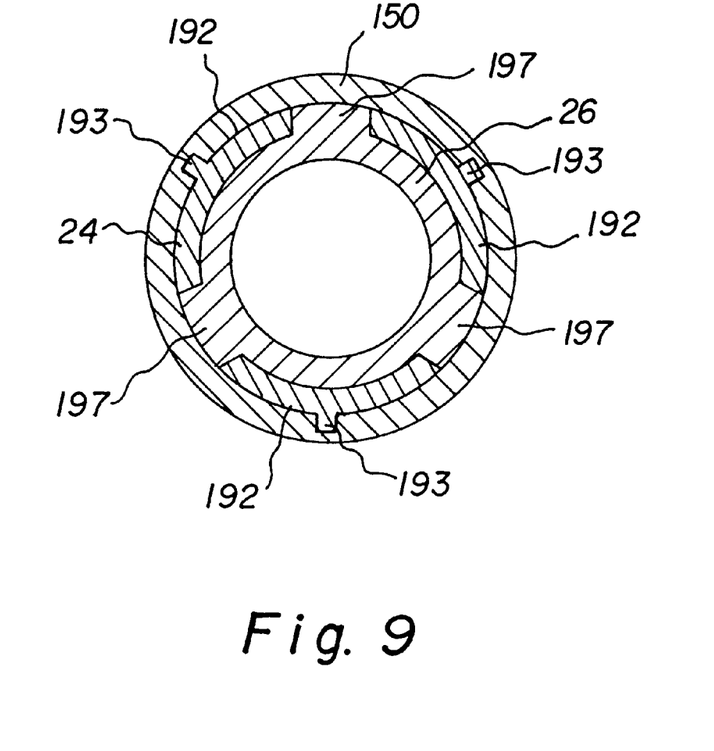
FIG. 9 illustrates schematically how a mid-lens cell fits inside a rear lens cell.
Figure 10:
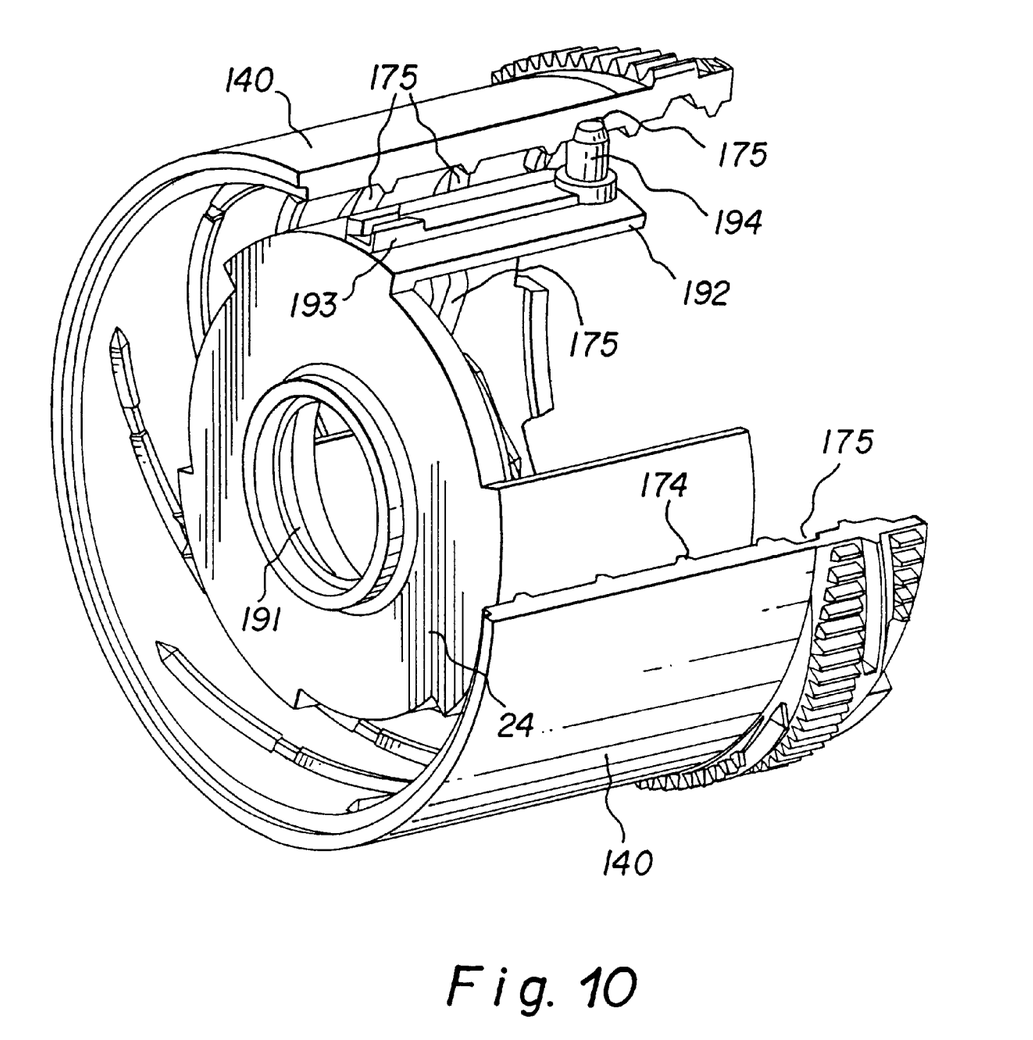
FIG. 10 depicts a mid-lens cell with a cam follower engaging a cam groove of the deployment barrel.

The mid-lens cell 24 has lens seats 191 (shown in FIGS. 2A–2C) that provide support for the mid-lens group 14 and also includes, on its external surface, a plurality of extended segments 192 with pads 193 and a plurality of pins 194. (See FIGS. 3, 9 and 10.) It is preferable that at least three pins 194 be used. The three pins define a plane through the mid-lens cell 24 and allow the mid-lens cell 24 to move along the optical axis, eliminating the need for the guide rods present in prior art. The segments 192 of the mid-lens cell 24 engage, through pins 194, the internal cam groove 175 of the deployment barrel 140. The pins 194 function as cam followers; they protrude through the guiding slots 195 of the front barrel 150 and engage the cam groove 175 of the movable deployment barrel 140. More specifically, the mid-lens cell 24 is mounted inside the front barrel 150 so that the pads 193 engage the internal straight linear grooves 186 of the front barrel 150. Thus, the mid-lens cell can slide within the front barrel 150 relative to the front and the rear lens cells 22, 26.

Figure 11:
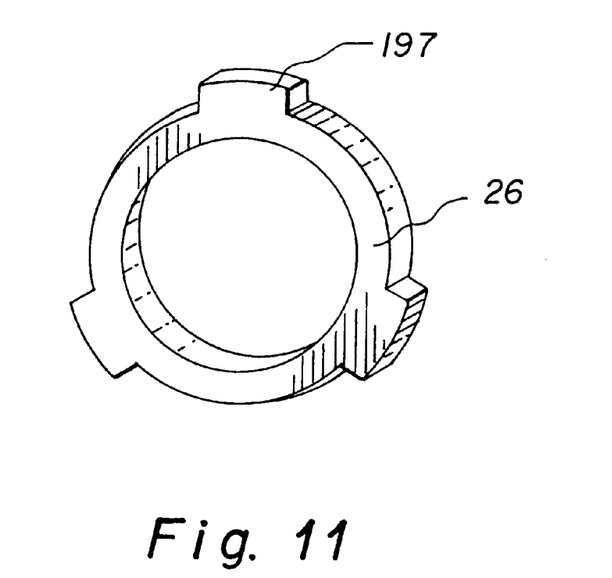
FIG. 11 illustrates a rear lens cell of the zoom lens assembly.

The rear lens cell 26 (FIG. 11) is also positioned inside the front barrel 150. This rear lens cell 26 includes at least one lens seat 196 (shown in FIGS. 2A–2C) for the rear lens group 16, and a plurality of radially symmetric pads 197 that are positioned between the segments 192 of the mid-lens sell 24 (see FIGS. 3 and 9). The rear lens cell 26 is fixedly attached to the front barrel 150, after the installation of the mid-lens cell, for example by cementing the pads 197 to the front barrel 150. The pads 197 align with cut-outs in cell 24 (FIG. 3).

A cover assembly 198 (FIG. 3) protects the lens elements and the rest of the zoom assembly 100 from scratches and dust. The cover assembly 198 is positioned in front of the front barrel 150 and is secured to the front barrel 150. The cover assembly 198 includes a plurality of cover gate leafs 198A and a cover actuator 198B. To prevent contamination of the lens elements and the shutter mechanism, the cover gate leafs 198A are closed by the cover actuator 198B when the lens barrels 130, 140, 150 in a the park position.

Lens Group Motion and Cam Profile

In order to move lens groups 12, 14, 16 from a wide angle position W to a telephoto position T, the zoom motor 169 is energized by current source. The zoom motor 169 brings the deployment barrel 140 into rotation through the gear train 168 which decreases rotational speed of the rotating shaft 169A by approximately 1000 times (at the same time the torque is increased 1000 times). More specifically, the spur gear 167 engages the deployment barrel's gear section 170 and rotates the deployment barrel 140.

The outer helical threads 173 of the deployment barrel 140 are engaged with the internal helical threads 164 of the frame barrel 120. When the deployment barrel rotates, it also moves linearly with respect to the frame barrel. As stated above, the deployment barrel 140 has the internal helical threads 174 which engage the external segmented helical thread 184 of the front barrel 150. When the deployment barrel 140 rotates, it moves the front barrel 150 along the optical axis 17. That is, the front barrel 150 is being moved outwards relative to the deployment barrel 140. The deployment barrel 140 and the front barrel 150, together, deliver the outer lens groups 12, 16 and the middle lens group 14 from the wide angle position to the telephoto position.

Figure 12:
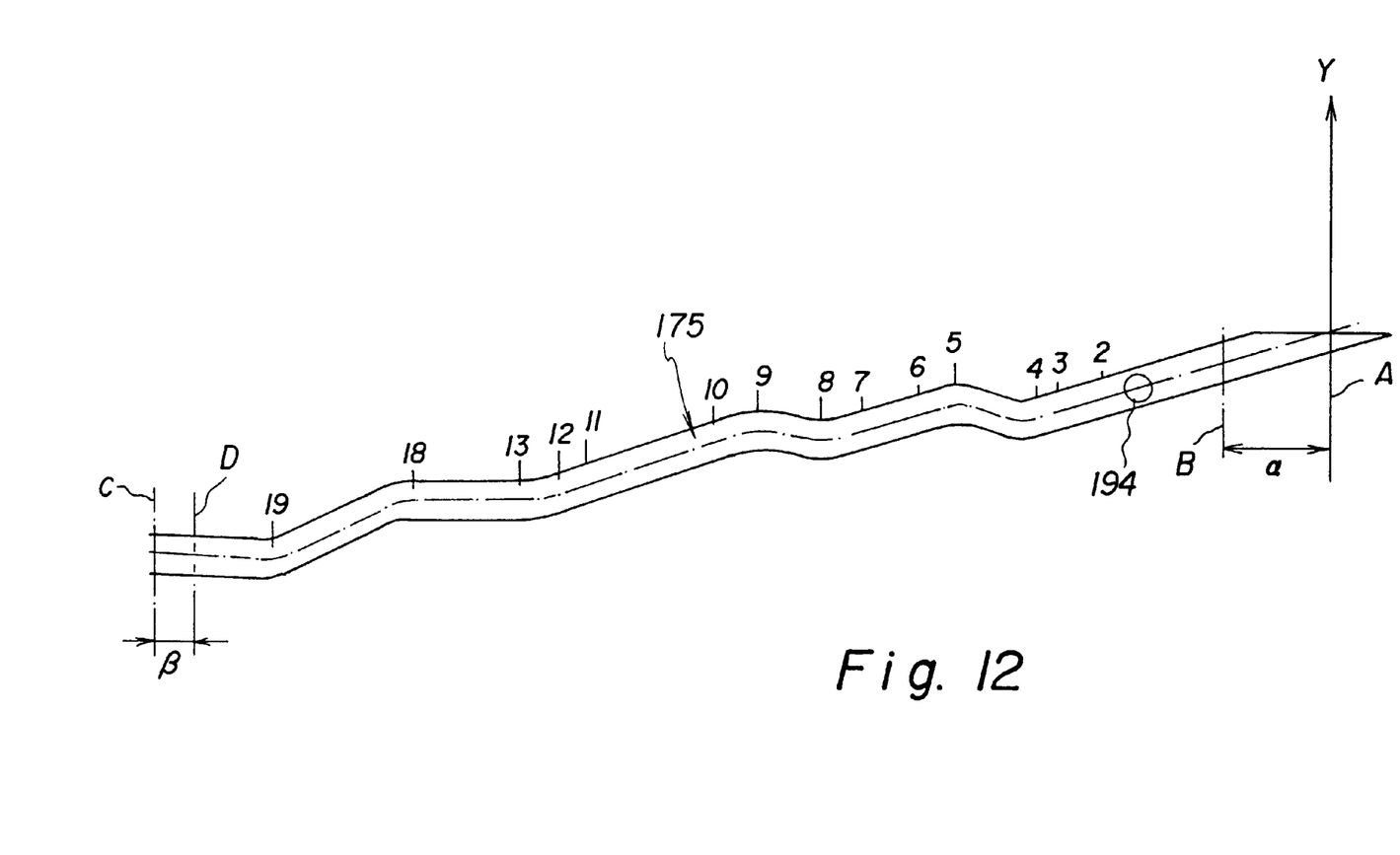
FIG. 12 illustrates the cam profile of the deployment barrel.

As discussed above, the internal cam grooves 175 of the rotating deployment barrel 140 engage the pins 194 of the mid-lens cell 24. (See FIG. 10.) In order to prevent the rotation of the mid-cell 24 within the front barrel 150, the mid-lens cell 24 has three segments 192 with pads 193 that are caught in the internal straight linear grooves 186 of the front barrel. This is shown schematically in FIG. 9. This configuration enables the mid-cell 24 to travel linearly with the front barrel 150 for the focus adjustment at the discreet zoom positions at the pace that is dictated by the cam profile of groove 175 in accordance with lens formula. That is, the cam profile of this embodiment allows the zoom lens to perform the zooming function and to focus for different object distances in each of the zoom positions. More specifically, the front and the rear lens cells 22, 26 move in unison and linearly along the optical axis 17 and the mid-lens cell 24 is moved along the optical axis, according to the cam profile, relative to the front and rear lens cells 22, 26. This cam profile is stepped and is illustrated in FIG. 12. The vertical axis (Y-axis) of this figure depicts the distance, in millimeters from the edge 199 of the rim of the deployment barrel 140. The horizontal axis depicts the rotation angle of the deployment barrel 140, the origin corresponding to the park position.

The cam profile of groove 175 (depicted in FIG. 12) also illustrates various positions of the pin 194 within the cam groove 175 which are represented by points 1 through 19. More specifically, point 1 corresponds to a parked position. FIG. 12 further illustrates the relationship between the position of the center of the cam groove along the Y-axis and the rotation angle of the deployment barrel. The Y-axis is parallel to the optical axis 17. The slope angles θ defining different sections of the cam groove 175 are measured with respect to the optical axis 17.

Figure 13:
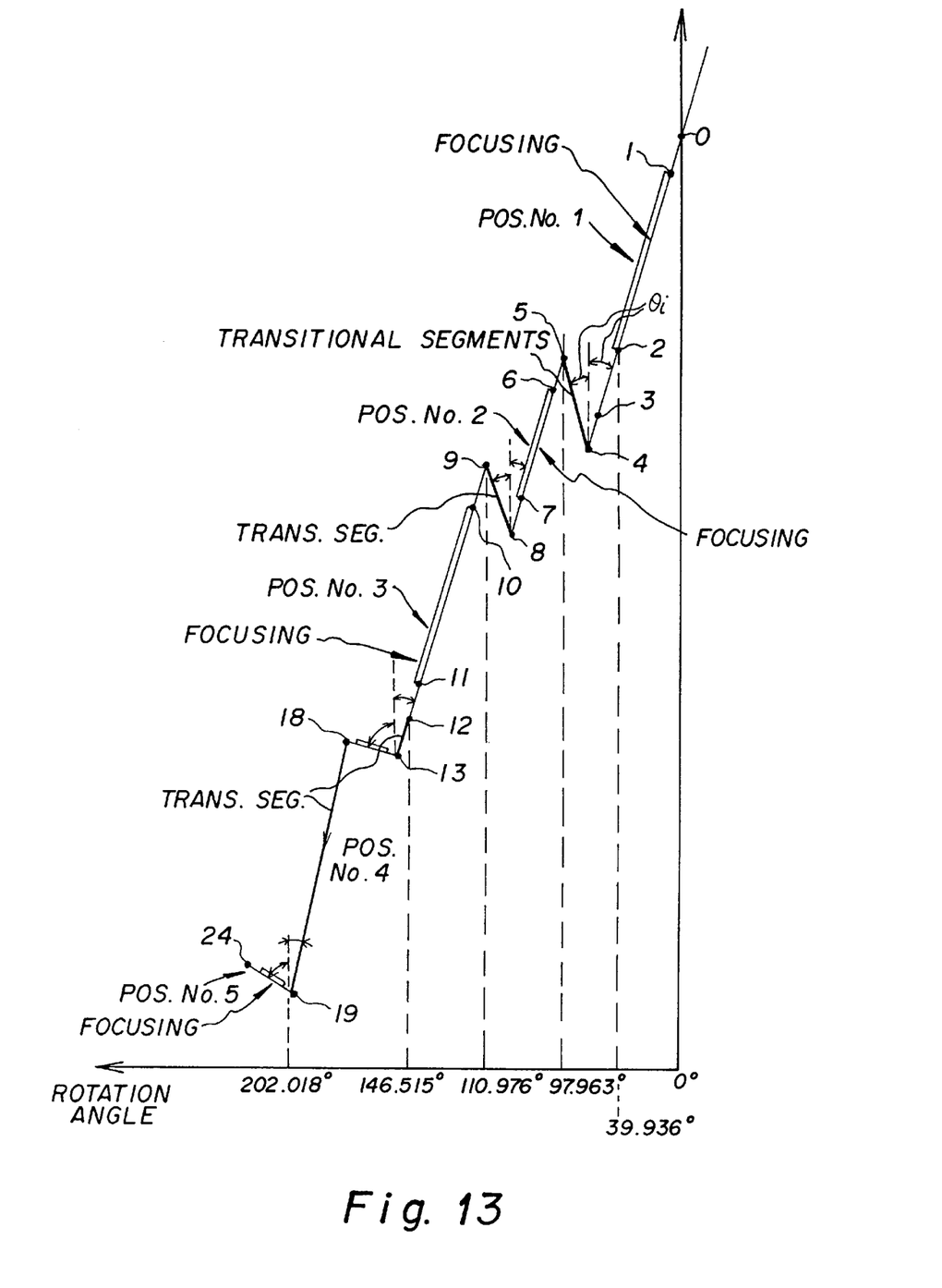
FIG. 13 illustrates the relationship between the cam position and the rotation angle of the deployment barrel.

FIG. 13 is similar to FIG. 12 but, also depicts which portions of the cam groove 175 are used for focusing and which portions are used for transitioning from one zoom position to another zoom position. The positions of the pin 194 within the cam groove 175 of FIG. 13 are again represented by points 0 through 19. The cam profile shown in FIGS. 12 and 13 is divided into two terminal zones α, β (defined by the lines A and B at the wide end and by the lines C, D at the telephoto end), several primary zoom segments corresponding to zoom positions one through five (Pos. #1 being the Wide angle position, Pos. #5 being the Telephoto position) and several transitional segments (represented by dark segments in FIG. 13). These segments, their location in the cam profile and the motion of the lens cells is described in detail below.

From the parked position to the first zoom position (i.e., Pos. #1, the wide angle position) all lens cells move together toward the object side and away from the camera body. This corresponds to the movement of the pin 194 from point 0 to point 1 of the cam groove. More specifically, the lens cells 22, 24 and 26 move in unison (i.e., at the same speed and direction) and the positions of the lens groups 12, 14, and 16 are fixed with respect to one another.

In the wide angle position (pin 194 moves from point 1 to point 2, FIGS. 12 and 13) the three lens cells 22, 24, 26 continue to move in unison to provide the focus adjustment for the objects located at different distances from the zoom lens (far objects to near objects). This is called a unitary focusing action. As the pin 194 continues to move from the point 2 to the point 4 the lens cells 22, 24 and 26 continue to move at the same speed and direction. The movement of the lens cells corresponding to the area between points 2 and 4 on FIGS. 12 and 13 compensates for the factory assembly errors, backlash, thermal perturbations and parts tolerances buildup.

The transitional segments facilitate transitions from one zoom position to another zoom position. The first transitional segment of the cam profile is bound by the points 4 and 5. Point 4 corresponds to the beginning of transition between the wide angle position (Pos. #1) and the second zoom position (Pos. #2). In order to arrive from the first zoom position to the second zoom position (point 5), the front and rear lens cells 22, 26 continue to move towards the object side while the mid-lens cell 24 reverses its direction of travel (FIG. 13). This corresponds to the change of slope in the cam profile at point 4 (See FIGS. 12 and 13) and to the segment bound by points 4 to 5. (The slope of the cam profile is measured relative to the optical axis 17.) Thus, during this transition between two zoom positions, the mid-lens cell 24 moves closer to the rear lens cell 26. It is noted that the first transitional segment has the slope of an opposite sign then the primary zoom segment bounded by the points 0 to 4.

The next second primary zoom segment corresponds to the second zoom position (Pos. #2). It is bounded by points 5 and 8. At the second zoom position (Pos. #2) the three lens cells 22, 24, 26 move in unison toward the object side (away from the camera body). The area of the graph between points 5 and 6 is used to compensate for the factory assembly errors, backlash, thermal perturbations and parts tolerances buildup. The area of the graph between points 6 and 7 is used to provide the focus adjustment when taking pictures in the second zoom position (Pos. #2). That is, as the pin 194 moves from point 6 to point 7, (FIGS. 12 and 13) the three lens cells 22, 24, 26 move in unison to provide the focus adjustment for the objects located different distances from the zoom lens. As the pin 194 continues to move from point 7 to point 8, the three lens cells continue to move forward at the same speed and direction. The area of between points 7 and 8 is used to compensate for the factory assembly errors, backlash, thermal perturbations and parts tolerances buildup.

In order to arrive from the second zoom position (Pos. #2) to the third zoom position (Pos. #3) the front and rear lens cells 22, 26 continue to move towards the object side while the mid-lens cell again reverses its direction of travel (FIG. 12). This corresponds to the change of slope in the cam profile at point 8 (See FIG. 12) and to the transitional segment bound by points 8 to 9. That is, the area between points 8 and 9 (See FIGS. 12 and 13) corresponds to the transition between the second zoom position (Pos. #2) and the third zoom position (Pos. #3). During this transition, the mid-lens cell 24 moves closer to the rear lens cell 26. It is noted that this transitional segment has the slope of an opposite sign then the adjacent, second primary zoom segment.

At the third zoom position (Pos. #3), corresponding to the third primary zoom segment bound by the points 9 and 13) the three lens cells 22, 24, 26 continue to move in unison toward the object. The areas of between points 9 and 10, 11 and 12 are used to compensate for the factory assembly errors, backlash, thermal perturbations and parts tolerances buildup. As in the previous zoom positions, when the pin 194 moves from point 10 to point 11, (FIGS. 12 and 13) the three lens cells 22, 24, 26 move in unison to provide a focus adjustment for the objects located different distances from the zoom lens. It is noted that the third primary zoom segment has the slope of the opposite sign then the proceeding transitional segment.

So far, in the first three primary zoom positions and in between these positions, the movements of the lens cells follow a similar pattern. However, the transition between the third zoom position (Pos. #3) and the fourth zoom position (Pos. #4) is different from the previously described transitions. In order to arrive to the forth zoom position the three lens cells 22, 24, 26 continue to move in unison toward an object. Thus, the slope of the cam profile does not change (see the cam segment between points 12 and 13, FIG. 12) and the sign of the slope stays the same.

In the fourth zoom position (Pos. #4) the focus adjustment is accomplished by moving the middle lens cell 24 toward the rear lens cell 26. This corresponds to the change of slope in the cam profile at point 13, and in reversal of the sign of the slope. (See the primary zoom segment bound by the points 13 to 18, FIG. 12). Thus, the focus adjustment is no longer achieved by moving the three lens cells at the same speed and direction. This is called a non-unitary focusing action.

In order to arrive at the fifth zoom position (Pos. #5, telephoto position) the three lens cells 22, 24, 26 move in unison toward the object side. The motion of the second lens cell 24 corresponds the segment of the graph that is bound by the points 18 to 19 (See FIG. 13). In the fifth zoom position the focus adjustment is accomplished by moving the middle lens cell toward the rear lens cell. This corresponds to the change of slope in the cam profile at point 19 (See FIG. 9) and to a portion of the segment bound by points 19 to 24 (See FIG. 13).

Thus, transitions between the first and second zoom, and the second and third zoom positions was accomplished by moving the middle lens cell 24 closer to the rear lens cell 26. This is shown by the change in slope from that of the preceding primary zoom sections of the transitional sections defined by the points 4, 5 and 8, 9 (See FIG. 12). The transition between the third and fourths zoom positions, as well as between the fourth and fifth zoom position was accomplished by moving all three lens cells 22, 24, 26 towards the object side at the same speed and direction (See cam sections bound by points 12 and 13; 18 and 19.)

The invention has been described in detail with particular reference to certain preferred embodiments thereof, but it will be understood that variations and modifications can be effected within the spirit and scope of the invention.

PARTS LIST 10 zoom lens
12 front lens group
14 middle lens group 16 rear lens group
17 optical axis
22 front lens cell
24 mid-lens cell
26 rear lens cell
100 zoom assembly
120 frame barrel
130 camera body
140 deployment barrel
150 front lens barrel
160 sleeve of the frame barrel
162 guide slot in the sleeve 160
163 key
163A ring of key 163
163B protrusion of key 163
163C arm of key 163
164 helical threads
166 support sleeve
167 long spur gear
168 gear train
169 motor
169A motor shaft
170 external gear section of deployment barrel 140
172 deployment barrel sleeve
173 outer threads of deployment barrel 140
174 internal threads of the deployment barrel 140
175 cam grooves of the deployment barrel 140
182 lens seats of first lens cell
184 outer threads in the front barrel 150
186 linear grooves of the front barrel
191 lens seats of mid-lens cell 24
192 segments of mid-lens cell 24
193 pads
194 pins
195 guiding slots of the deployment barrel 140
196 lens seats for the rear lens group 16
197 pads of the rear lens cell 16
198 cover assembly
198A cover gate leafs
198B cover actuator
199 edge of the deployment barrel 140

What is claimed is:

1. A zoom assembly comprising:
   a zoom lens consisting of a front lens group, a middle lens group and a rear lens group, said front and rear lens group moving along an optical axis defined by said lens groups at the same speed and direction;
   a zooming mechanism including
   (i) a first, movable barrel enclosing said front, middle and rear lens groups, wherein said front and rear lens groups are supported by front and rear lens cells, respectively, at least one of said front and rear lens cells being formed as an integral part of said first, movable lens barrel and said front and rear lens cells located at a fixed distance with respect to one another, said middle lens group being supported by a mid-lens cell, said mid-lens cell being slidably movable within said first, movable barrel and having at least three external cam followers;
   (ii) a second, movable barrel, engaging and at least partially enclosing said first barrel, said second barrel being rotatable and including three cam grooves engaging said cam followers; and
   (iii) a single motor, operatively connected to said second, movable barrel, said motor rotating said second, movable barrel, said rotation of said second barrel (a) moving said second, movable barrel along said optical axis with respect to said a first, movable barrel, and
   (b) moving said cam followers within said cam grooves such that said mid-lens group moves axially at a different rate than said front and said rear lens groups.

2. A zoom assembly according to claim 1, wherein
   (i) said first, movable barrel includes a helical thread; and
   (ii) said second, movable barrel having a complimentary helical thread engaging said helical thread of said first, movable barrel.

3. A zoom assembly according to claim 2, further comprising:
   a third, stationary barrel, wherein said third, stationary barrel at least partially encloses said second, movable barrel, and said second, movable barrel is positioned to move along said optical axis within said third, stationary barrel during zooming.

4. A zoom assembly according to claim 3, wherein said third, stationary barrel further includes internal threads;
   said second, movable barrel includes external treads, said external threads of said second, movable barrel engaging said internal threads of said third, stationary barrel, such that said second, movable barrel moves along said optical axis within said third, stationary barrel during zooming.

5. A zoom assembly according to claim 4, further comprising a gear train operated by said motor; and
   said external threads of said second, movable barrel include a gear profile forming a gear segment, said gear segment engaging said gear train, thereby rotating said second, movable barrel.

6. A zoom assembly according to claim 1, further comprising:
   a third, stationary barrel, wherein said third, stationary barrel at least partially encloses said second, movable barrel, and said second, movable barrel is moving, along said optical axis, within said third, stationary barrel during zooming.

7. A zoom assembly according to claim 1, wherein said motor is a DC motor.

8. A zoom assembly according to claim 1, wherein said zoom lens mechanism includes no more than one barrel with said cam grooves.

9. A zoom assembly according to claim 8, further comprising a third, stationary barrel and a key that prevents rotation of said third, stationary barrel relative to said second, movable barrel, but allows said second, movable barrel to rotate within said third, stationary barrel.

10. A zoom assembly according to claim 8, wherein said first, movable barrel further includes guiding slots, and said cam followers protrude through said guiding slots.

11. A zoom assembly according to claim 1, wherein said three cam grooves are identical.

12. A zoom assembly according to claim 11, wherein said second, movable barrel includes an external gear section for operatively engaging said motor.

13. A zoom assembly according to claim 1, wherein said front lens group has negative optical power, said second lens group has positive optical power and said rear lens group has negative optical power.

14. A zoom assembly according to claim 13, wherein at least two of said lens groups have an aspherical surface.

15. A zoom lens according to claim 1, wherein said first movable lens barrel moves along the optical axis and does not rotate.

16. A zoom assembly comprising:

a zoom lens consisting of a front lens group, a middle lens group and a rear lens group, said front and rear lens group moving along an optical axis defined by said lens groups at the same speed and direction;

a zooming mechanism including
- (i) a first, movable barrel enclosing said front, middle and rear lens groups, wherein said front and rear lens groups are supported by front and rear lens cells, respectively, at least one of said front and rear lens cells being formed as an integral part of said lens barrel and said front and rear lens cells being located at a fixed distance with respect to one another, said middle lens group being slidably supported by a mid-lens cell, being movable relative to said front and rear lens groups and having a plurality of cam followers; and
- (ii) a single sleeve having a plurality of identical cam grooves, said single sleeve forming a second, movable barrel, said second, movable barrel engaging and at least partially enclosing said first barrel, said second barrel being rotatable about said optical axis, said cam grooves engaging said plurality of cam followers.

17. A zoom assembly of claim 16 further comprising:

a single motor, operatively connected to said second, movable barrel, said motor rotating said second, movable barrel, said rotation of said second, movable barrel is
- (i) moving said second, movable barrel along said optical axis with respect to said first, movable barrel,
- (ii) moving said cam followers within said cam grooves such that said mid-lens group moves axially at a different rate than said front and said rear lens groups.

18. A zoom assembly comprising:

a zoom lens consisting of a front lens group, a middle lens group and a rear lens group, said front and rear lens group moving along an optical axis defined by said lens groups at the same speed and direction;

a zooming mechanism including
- (i) a first, movable barrel enclosing said front, middle and rear lens groups, wherein said front and rear lens groups are supported by front and rear lens cells, respectively, at least one of said front and rear lens cells being formed as an integral part of said lens barrel and said front and rear lens cells located at a fixed distance with respect to one another, said middle lens group being slidably supported by a mid-lens cell, said mid-lens cell having at least three external cam followers;
- (ii) a second, movable barrel, engaging and at least partially enclosing said first barrel, said second barrel being rotatable and including three grooves engaging said cam followers;
- (iii) a single, zooming and focusing motor, operatively connected to said second, movable barrel, said motor rotating said second, movable barrel, said rotation of said second barrel
  - (a) moving said second, movable barrel along said optical axis with respect to said a first, movable barrel, and
  - (b) moving said cam followers within said cam grooves such that said mid-lens group moves axially at a different rate than said front and said rear lens groups thereby providing said zoom lens with both a zooming and a focusing function.

19. A zoom assembly of claim 18, wherein at least one of said lens groups has positive optical power and at least another one of said lens group has negative optical power.

20. A zoom assembly according to claim 19, wherein said zoom lens has at least one aspheric surface.

21. A zoom assembly according to claim 18, wherein at least two of said lens groups have at least one aspheric surface.

22. A zoom assembly according to claim 19, wherein said middle lens group moves non-linearly with respect to said front and rear lens groups.

23. A zoom assembly according to claim 19, wherein said middle lens group moves step-wise with respect to said front and rear lens groups.

* * * * *